United States Patent [19]
Stephenson et al.

[11] Patent Number: 5,427,192
[45] Date of Patent: Jun. 27, 1995

[54] SLIDING PEDESTAL SHAFT FOR PTO DRIVEN IMPLEMENTS

[75] Inventors: Roger D. Stephenson; James L. Vogt; Roger W. Frimml, all of Ottumwa, Iowa

[73] Assignee: Deere & Company, Moline, Ill.

[21] Appl. No.: 976,812

[22] Filed: Nov. 16, 1992

[51] Int. Cl.$^6$ ............................................. B60K 25/06
[52] U.S. Cl. ................................. 180/53.1; 180/53.6; 180/384; 464/169; 464/117
[58] Field of Search .................. 180/53.1, 53.6, 53.61, 180/14.1, 14.4, 53.8, 381, 382, 383, 384; 464/162, 169, 117

[56] References Cited

U.S. PATENT DOCUMENTS

| | | | |
|---|---|---|---|
| 1,355,516 | 10/1920 | Stahl | 180/383 X |
| 1,881,609 | 10/1932 | Huwe | 180/53.1 |
| 1,911,507 | 5/1933 | Hitchcock | 464/117 X |
| 2,468,182 | 4/1949 | Dempsey | 180/53.1 X |
| 2,556,380 | 6/1951 | Stillwagon, Jr. | 464/169 |
| 2,580,110 | 12/1951 | Mabry | 180/53.1 X |
| 3,007,535 | 11/1961 | Lippke | 180/53.1 X |
| 3,069,875 | 12/1962 | Crum, Jr. | 464/169 |
| 3,122,901 | 3/1964 | Thompson | 464/117 |
| 3,557,892 | 1/1971 | Burrough | 180/14.1 |
| 3,908,398 | 9/1975 | Braunberger | 180/14.1 |
| 4,020,913 | 5/1977 | Yatcilla | 180/14.1 |
| 4,204,411 | 5/1980 | Jeanson | 180/14.1 X |
| 4,714,123 | 12/1987 | Ermacora et al. | 180/53.1 X |
| 4,738,461 | 4/1988 | Stephenson et al. | 180/53.1 X |
| 5,158,500 | 10/1992 | McLean | 180/53.1 |

*Primary Examiner*—Brian L. Johnson
*Assistant Examiner*—F. Zeender

[57] ABSTRACT

An implement is coupled for being driven and towed by a tractor. A pedestal shaft is slidably mounted to the tongue of the implement and is coupled to the tractor PTO by a telescopic shaft which during turning and certain rolling and or pitching conditions of the tractor acts to cause rearward shifting of the pedestal shaft from a normal operating position. A spring assembly resists the rearward movement of the pedestal shaft and returns it to its normal position once the condition which caused its rearward movement no longer exists.

10 Claims, 4 Drawing Sheets

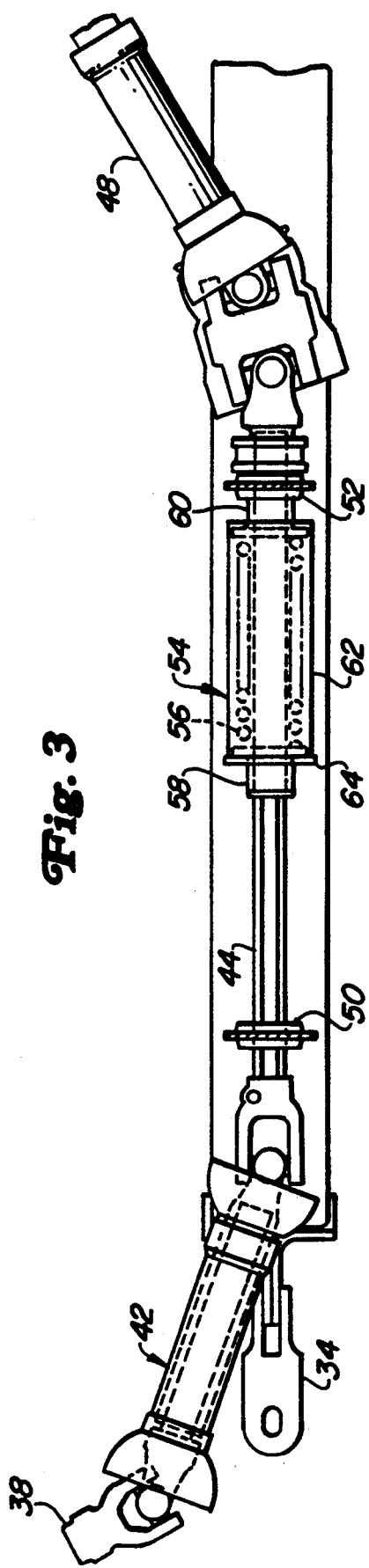
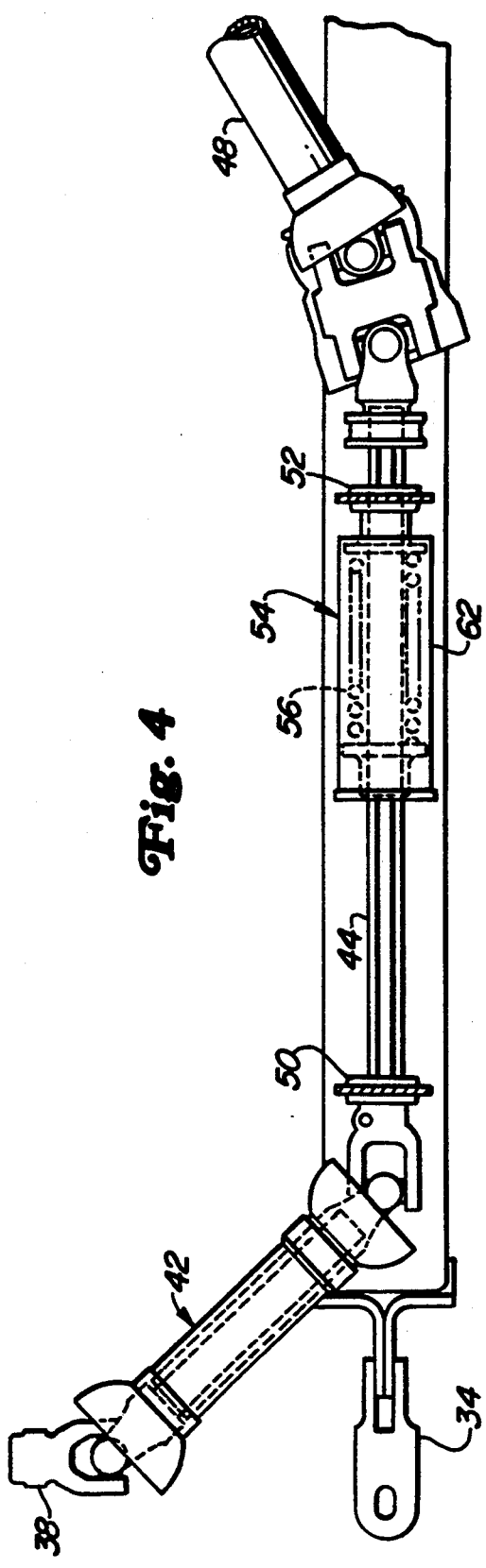

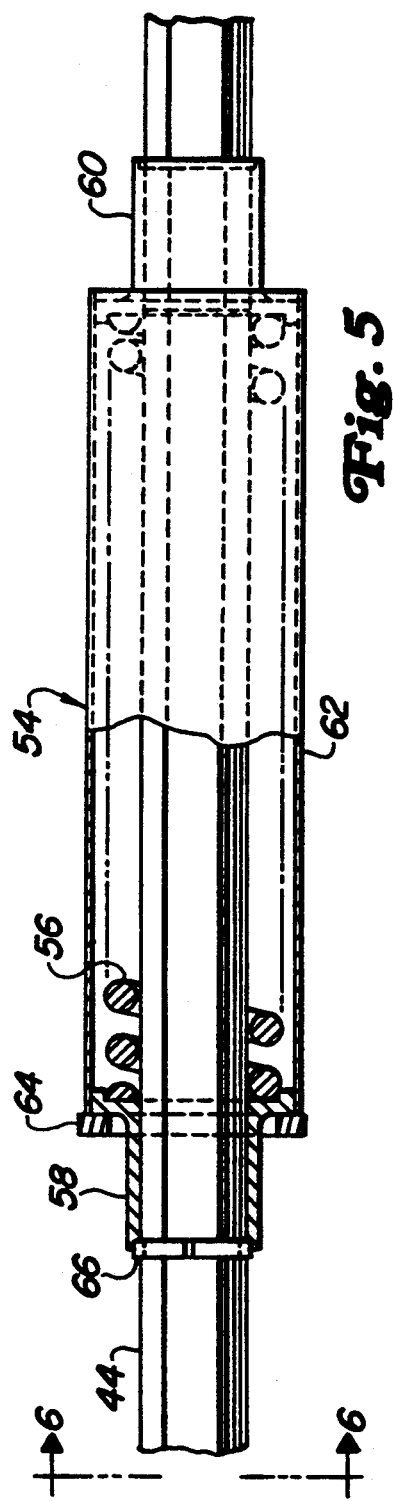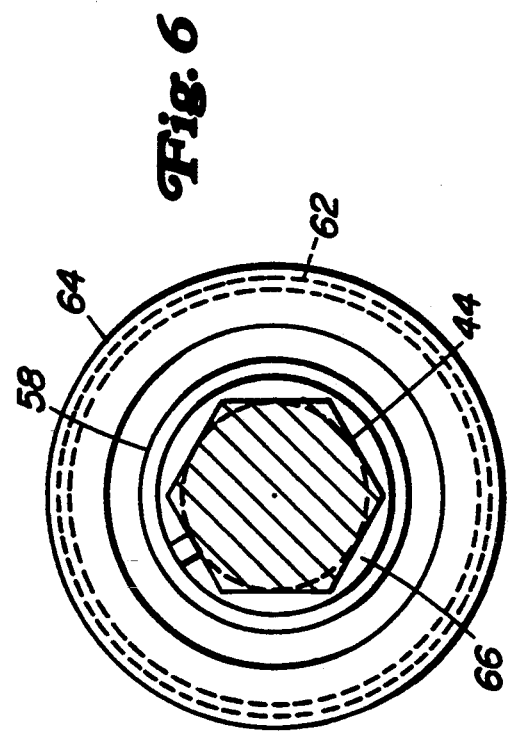

SLIDING PEDESTAL SHAFT FOR PTO DRIVEN IMPLEMENTS

BACKGROUND OF THE INVENTION

The present invention relates to PTO driven implements and more specifically relates to drivelines for such implements.

Implements driven from the power-take-off (PTO) of a towing tractor have drivelines which usually include a telescopic shaft coupled between the tractor PTO and a pedestal shaft supported by the implement draft tongue. These arrangements have a problem with the telescopic shaft either bottoming out or coming apart during certain conditions. Specifically, the telescopic shaft can bottom out when the tractor pitches up and/or rolls toward the implement when the tractor is turning and can separate when the tractor pitches down and/or rolls away from the implement when the tractor is travelling more or less straight ahead.

Heretofore, there have been two solutions to this problem. One solution has been to provide draw bar extensions on the tractor to provide more length for the telescopic drive shaft. This extra length allows the tractor to move through a greater range before the drive shaft either bottoms out or separates. This solution is disclosed in U.S. Pat. No. 3,557,892 issued on 26 Jan. 1971. Another solution has been to allow the pedestal shaft to pivot out of the way when the telescopic shaft bottoms out. This approach is disclosed in U.S. Pat. No. 3,908,398 issued on 30 Sep. 1975 and U.S. Pat. No. 4,020,913 issued on 3 May 1977.

The first solution mentioned above has the drawbacks of requiring parts to be stored when not in use and of being cumbersome to install and remove, while the latter mentioned solution has the drawbacks of requiring a relatively large number of parts to be assembled resulting in the assembly being relatively cumbersome and expensive.

SUMMARY OF THE INVENTION

According to the present invention, there is provided an improved implement driveline arrangement for accommodating articulation of the towing tractor relative to the implement without adversely affecting the driveline.

A broad object of the invention is to provide an implement driveline having a pedestal shaft which is linearly shiftable for ensuring that undue forces will not be induced in the driveline when the tractor PTO-connected telescopic shaft bottoms out as when the tractor is undergoing pitch or roll movements during turning operation.

A more specific object of the invention is to provide a pedestal shaft mounting, as set forth in the previous object, including an encapsulated compression spring which restores the pedestal shaft to a normal operating position once the conditions of operation return to a more normal condition wherein undue forces are no longer transferred to the driveline via the telescopic shaft.

These and other objects will become apparent from a reading of the following description together with the appended drawings.

BRIEF DESCRIPTION OF THE DRAWINGS

FIG. 3 is an enlarged top plan view of the pedestal shaft, with shielding removed, as it appears during normal turning operation.

FIG. 4 is like FIG. 3 but showing the pedestal shaft as it appears when the telescopic drive shaft is completely bottomed out and transferring force collapsing the encapsulated compression spring.

FIG. 5 is an enlarged view of the encapsulated spring and its mounting to the pedestal shaft with portions of the spring container being broken away.

FIG. 6 is a sectional view taken along line 6—6 of FIG. 5.

DESCRIPTION OF THE PREFERRED EMBODIMENT

Figure 1:
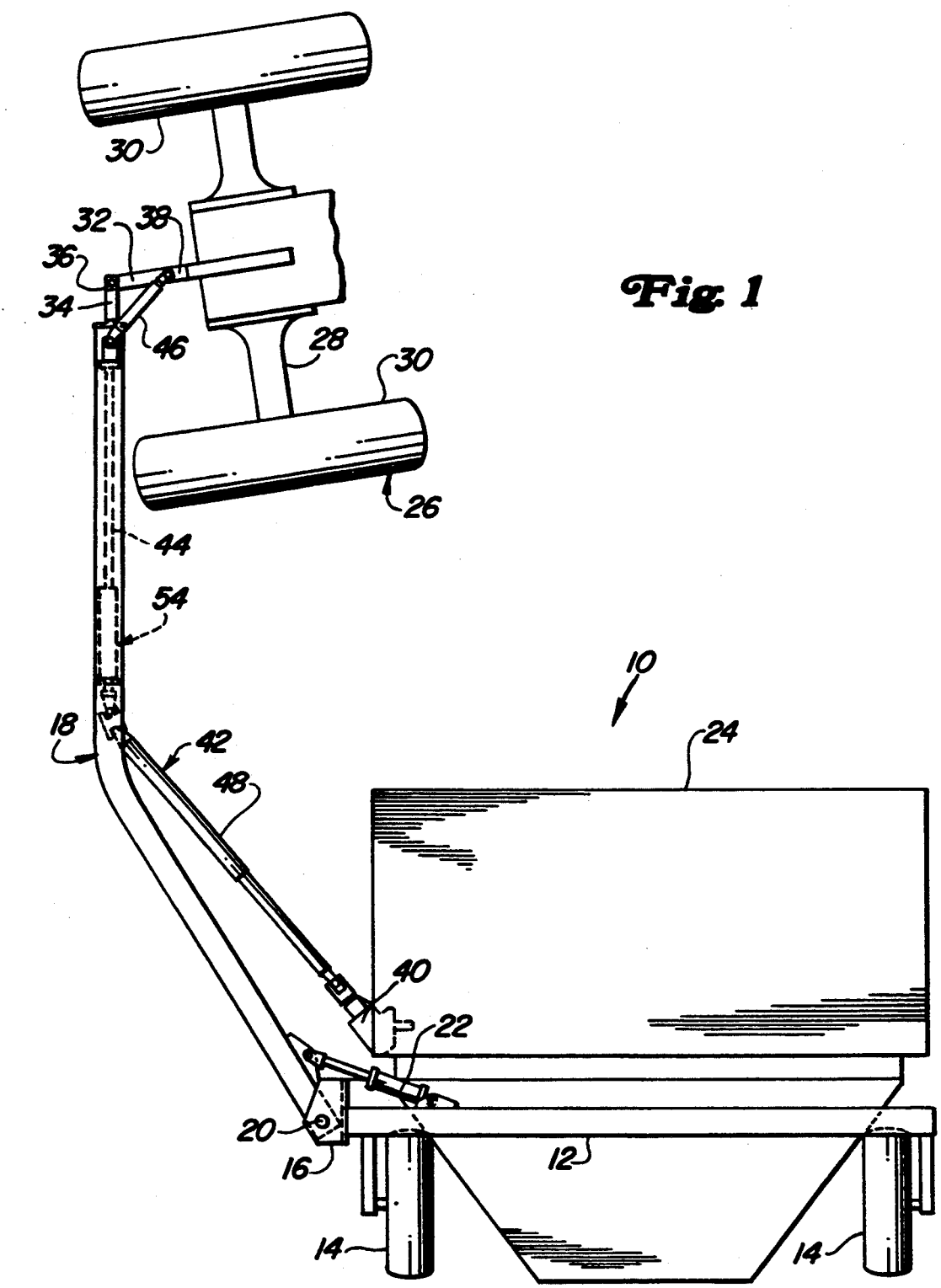
FIG. 1 is a top plan view showing a tractor connected to a towed implement having a driveline constructed in accordance with the principles of the present invention.
Figure 2:
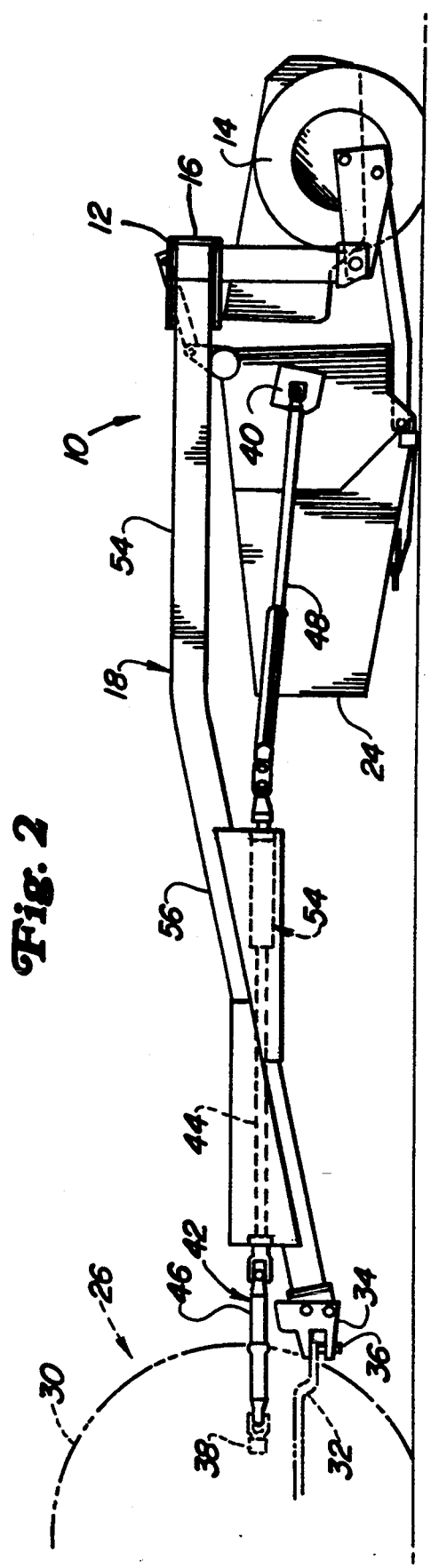
FIG. 2 is a left side elevational view of the tractor and implement shown in FIG. 1.

Referring now to FIGS. 1 and 2, there is shown a towed and driven implement 10, here shown as a mower-conditioner having a cross frame member 12 supported at its opposite ends by a pair of ground wheels 14. Joined to the left end of the frame member 12 is a bracket 16 including a pair of superposed plates between which the rear end of an elongate draft tongue 18 is received and to which the tongue is horizontally pivotally attached by means of an upright pin 20. An extensible and retractable hydraulic cylinder and piston unit 22 is connected between the tongue for selectively positioning the tongue either in an outwardly angled working position, as shown, or in an inward transport position wherein the rear portion of the tongue extends along side a left end of a header 24 of the implement, the header including a driven cutter bar assembly, not shown, for severing crop from the ground.

Power for driving the header is derived from a tractor 26 including a rear axle housing 28 having opposite ends from which rear axles (not shown) project, the axles carrying respective rear wheels 30. The tractor 26 is equipped with a drawbar 32. A clevis 34 at the forward end of the tongue 18 is connected to the drawbar by a hitch pin 36.

The tractor 26 is provided with a PTO shaft 38. The implement 10 includes a main drive gear box 40 and a driveline 42 transmits power from the PTO shaft 38 to the gear box 40. The driveline 42 comprises a pedestal shaft 44 carried by the draft tongue 18, a front telescopic shaft 46 having a front u-joint coupled to the PTO shaft 38 and a rear u-joint coupled to the forward end of the pedestal shaft 44. The driveline 42 also includes a second telescopic shaft 48 having a u-joint at its forward end coupled to a u-joint at the rear end of the pedestal shaft 44 and a u-joint at its rear end coupled to an input shaft of the gear box 40.

Referring now also to FIGS. 3–6, it can be seen that the pedestal shaft 44 is hexagonal in vertical cross section and is supported from the draft tongue 18 by front and rear pedestal bearings 50 and 52, respectively, the bearings not being shown in detail but each being of a known construction including a rotatable inner race having a hexagonal opening therethrough in which the pedestal shaft is slidably received, and an outer race which is fixed to the tongue. Mounted to the pedestal shaft 44, at a location adjacent the rear bearing 52 is a spring capsule 54 including a helical compression spring 56 encircling the shaft 44 and having opposite ends respectively engaged with front and rear spring retainers 58 and 60. Each of the spring retainers 58 and 60 is provided with a hexagonal hole having the shaft 44 located therein. The rear retainer 60 abuts a front surface of the rear bearing 52 and is welded to the inner surface of a rear end of a cylindrical shell 62 while the front retainer 58 is engaged with a rear surface of a stop washer 64 welded to the forward end of the shell, the front retainer 58 thus being free to move toward the rear retainer 60 against the bias of the spring 56 but being prevented from forward motion by the stop washer 64. A snap ring 66 is provided in a circular groove provided in the shaft 44 such that the ring 66 engages the front of a hub of the front spring retainer 58 so as to act against the latter to compress the spring 56 when the shaft 44 is caused to shift rearward, as shown in FIG. 4, once the front telescopic shaft 46 has bottomed out during turning of the tractor at a time when the terrain causes the tractor to pitch or roll towards the implement. This rearward movement of the pedestal shaft 44 prevents undue forces from being transferred to the driveline 42.

It is here noted that in the present embodiment the rear telescopic shaft 48 accommodates this rearward movement of the pedestal shaft 44. Once the terrain becomes more level and the tractor assumes a more normal attitude relative to the implement, the spring 56 acts to restore the driveline 42 and hence the shaft 46 to its normal forward position shown in FIG. 3.

While in the preferred embodiment, the pedestal shaft shifts while the draft tongue remains stationary, it is possible that a draft tongue could be made with a subframe that is shiftable relative to a fixed pedestal shaft. This would accomplish the desired result of permitting relative movement between the draft tongue and the pedestal shaft so as to prevent the telescopic shaft from bottoming out during turning of the tractor at a time when the terrain causes the tractor to pitch or roll toward the implement.

We claim:

1. In a driven implement adapted to be powered and towed by a tractor and including a fore-and-aft extending draft tongue respectively supporting, at fixed spaced apart first and second locations, front and rear pedestal bearings, a pedestal shaft received in said pedestal bearings and a telescopic shaft having a rear end coupled for driving the pedestal shaft and having a forward end adapted for being coupled to a tractor PTO shaft, the improvement comprising: said front and rear pedestal bearings including mounting means permitting the pedestal shaft to slide fore-and-aft relative thereto to and from a normal operating position wherein a forward end of the pedestal shaft is located at a forwardmost location relative to said draft tongue; and yieldable spring means coupled to said pedestal shaft for resisting rearward movement of the forward end of said pedestal shaft from said normal operating position and for returning the same to said normal operating position once conditions causing rearward shifting of the pedestal shaft are no longer in effect.

2. The driven implement defined in claim 1 wherein said spring means comprises a spring capsule including front and rear spring retainers, a coil compression spring having opposite ends respectively engaged with the retainers, a cylindrical shell encasing said spring and having a rear end welded to the rear spring retainer and a forward end encircling but free of the front spring retainer, first and second stop members respectively being fixed to said shell and pedestal shaft and being engaged with a forward facing surface of the front spring retainer and said rear spring retainer being engaged with a forward surface of said rear pedestal bearing.

3. The driven implement as defined in claim 2 wherein said first stop is a washer welded to said shell.

4. The driven implement as defined in claim 2 wherein said second stop is a snap ring carried by said pedestal shaft.

5. In a driven implement having a fore-and-aft extending draft tongue, a pedestal shaft supported by the draft tongue and a telescopic drive shaft coupled to the pedestal shaft and adapted for being coupled to a tractor PTO, the improvement comprising: mounting means coupling said pedestal shaft to the draft tongue for permitting relative fore-and-aft movement between the pedestal shafts, in its entirety, and the tongue from and to a normal working position wherein said pedestal shaft occupies a forwardmost location relative to said tongue; and biasing means coupled for yieldably resisting relative movement between said tongue and pedestal shaft, in its entirety, away from said normal working position and for restoring said normal working position of said tongue and pedestal shaft once a condition causing said relative movement from said normal working position has passed.

6. The driven implement defined in claim 5 wherein said mounting means includes spaced front and rear pedestal bearings.

7. The driven implement defined in claim 5 wherein said biasing means includes a spring assembly comprising a coil compression spring encircling said pedestal shaft; a rear stop means preventing rearward movement of said spring; a forward stop means mounted for movement with the pedestal shaft and positioned in engagement with a forward end of the spring, whereby rearward movement of the pedestal shaft effects compression of said spring.

8. The driven implement defined in claim 7 wherein said mounting means includes front and rear, fixed pedestal bearings supporting said pedestal shaft for rotation and fore-and-aft movement; said rear stop means comprising a rear spring retainer engaged with a rear end of the spring and with a forward surface of said rear pedestal bearing; said front stop means comprising a front spring retainer located between and in engagement with a front end of the spring and with a stop member fixed to the pedestal shaft, whereby rearward movement of said shaft will act through said stop member and said front spring retainer to effect compression of said spring.

9. The driven implement defined in claim 8 wherein said spring assembly includes a cylindrical shell encircling said pedestal shaft; and said rear spring retainer being fixed to a rear end of said shell while said front spring retainer is mounted to move freely fore-and-aft within said shell.

10. The driven implement defined in claim 9 wherein said spring assembly further includes a stop washer fixed to a forward end of said shell and being engaged with a front surface of said spring retainer when said spring is in a relatively free uncompressed state.

* * * * *